Aug. 28, 1934.                K. DAVIS                1,971,678
         MECHANISM FOR SEPARATING INTERMIXED DIVIDED MATERIALS
                Original Filed Feb. 7, 1928    3 Sheets-Sheet 1

Aug. 28, 1934. K. DAVIS 1,971,678
MECHANISM FOR SEPARATING INTERMIXED DIVIDED MATERIALS
Original Filed Feb. 7, 1928 3 Sheets-Sheet 3
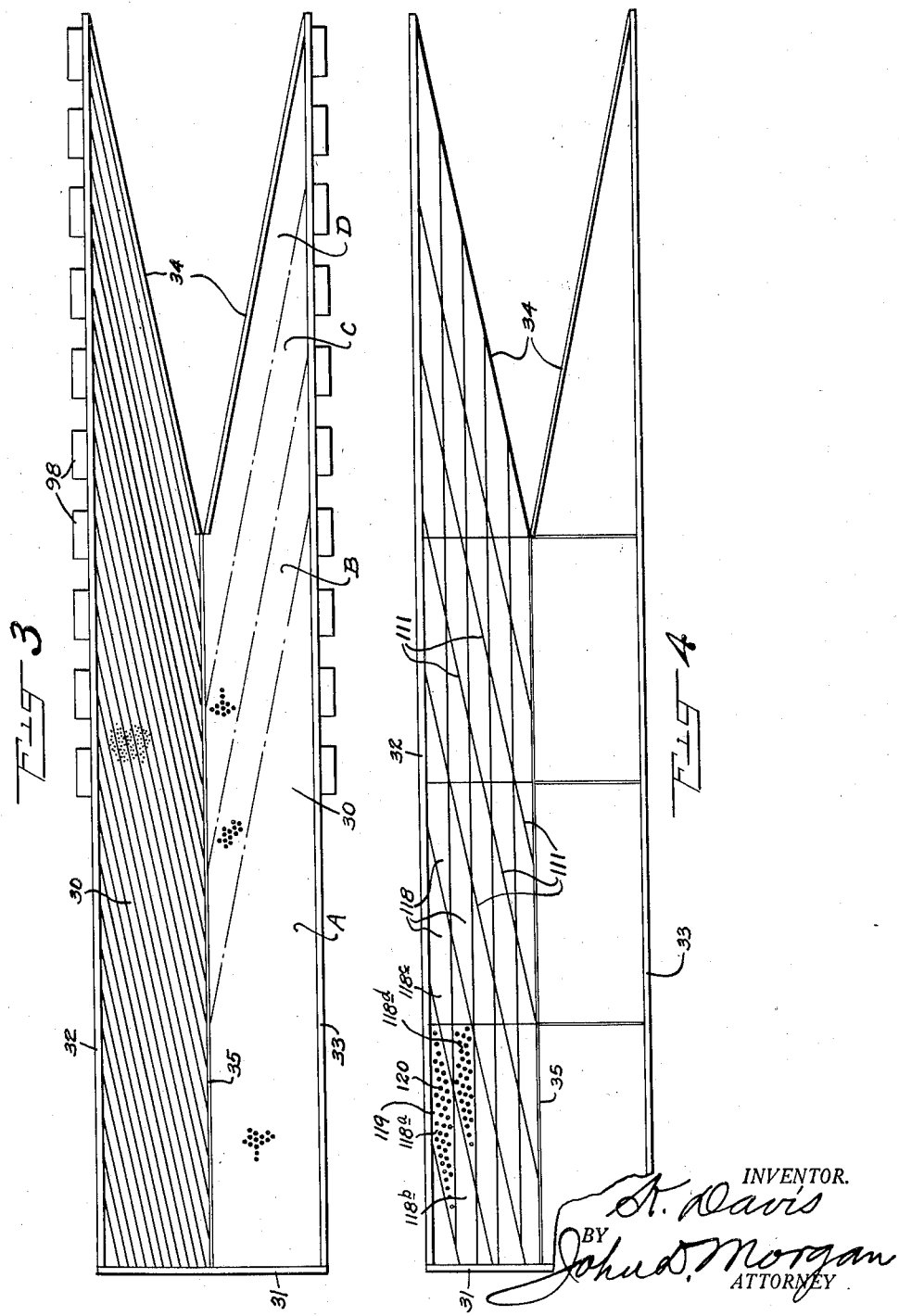

Patented Aug. 28, 1934

1,971,678

UNITED STATES PATENT OFFICE 1,971,678

MECHANISM FOR SEPARATING INTERMIXED DIVIDED MATERIALS

Kenneth Davis, Ebensburg, Pa., assignor, by mesne assignments, to Peale-Davis Company, Wilmington, Del., a corporation of Delaware Application February 7, 1928, Serial No. 252,544
Renewed December 11, 1931

3 Claims. (Cl. 209—502)

The invention relates to a mechanism for separating intermixed, divided materials, and more especially to a process and mechanism for practically completely separating intermixed, divided materials varying relatively very greatly in size, but varying relatively very little in their specific gravities.

Objects and advantages of the invention will be set forth in part hereinafter and in part will be obvious herefrom, or may be ascertained by practice with the invention.

The invention consists in the novel steps, processes, parts, combinations, constructions and arrangements herein shown and described.

The accompanying drawings, herein referred to and constituting a part hereof, illustrate instrumentalities conveniently adapted for carrying out the process, and embodying the mechanical features of the invention; said drawings serving to illustrate an embodiment of the invention and together with the description to explain the principles thereof.

Fig. 3 is a diagrammatic view of the deck showing the separating partitions and the air zoning;

Fig. 4 is a similar figure showing the sub-zone chambers; and

Fig. 5 is an enlarged section on line 5—5 of Fig. 3.

Figure 1:
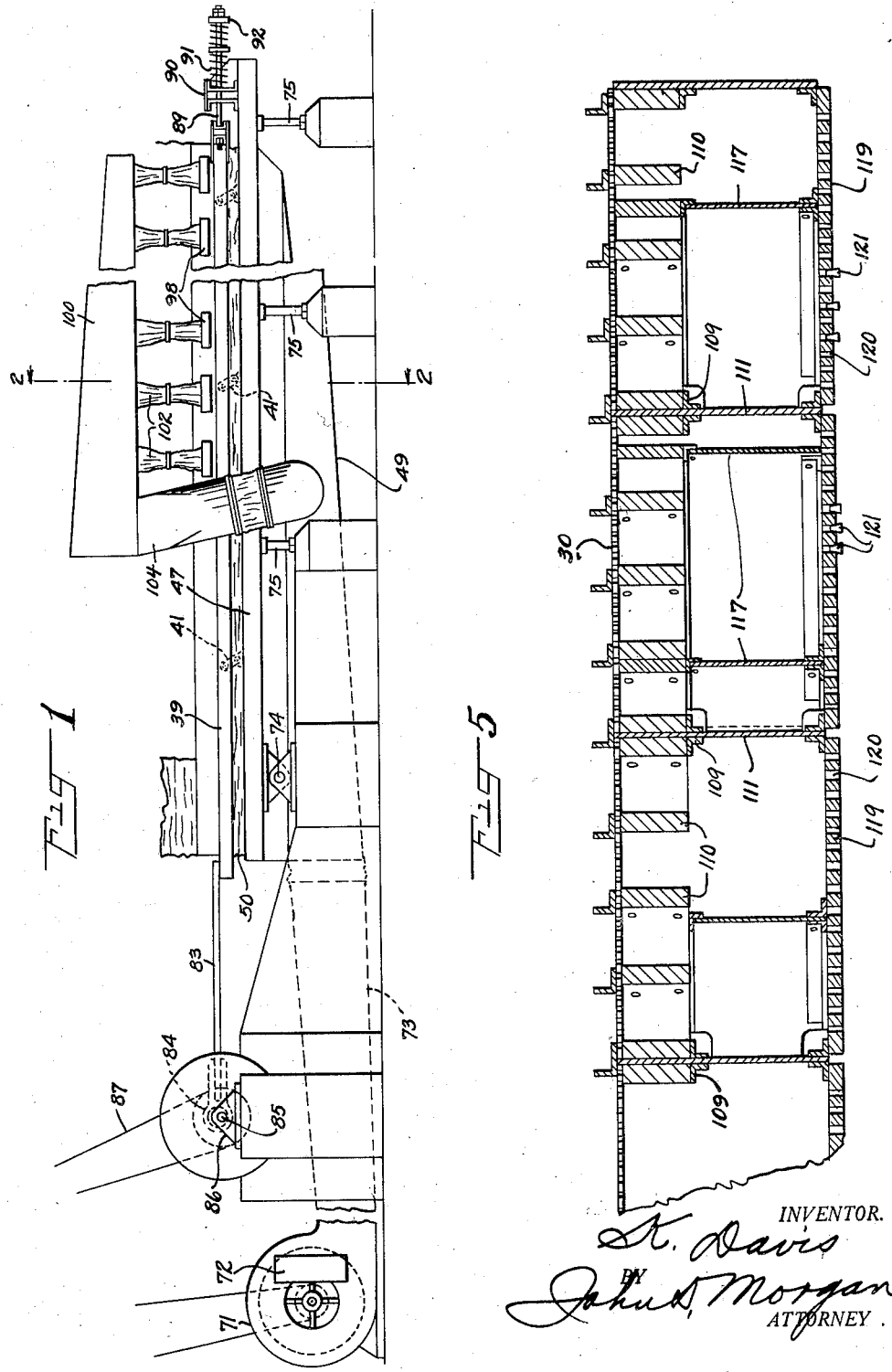
Fig. 1 is an elevation of a mechanism embodying the invention.

The separation of intermixed divided materials which are of uniform size, or which vary relatively greatly in their specific gravities, or which embody both of these characteristics, is a relatively simple problem. Such a problem is presented by the separation of precious metals from the gangue, wherein the entire mixture of materials is finely pulverized, and the specific gravity of the gangue is very light and that of the metals is very heavy. In previous practice in the separation of materials having very close specific gravity, it has been customary to size or separate by screening the materials to very fine degrees of dimensional gradation. This previous requisite has compelled the use of a large number of screens or sizing mechanisms as a preliminary, and a separating table for each of the various sizes or classifications produced by the sizing machines. This rendered the operation slow, cumbrous and expensive. By my invention, no previous or preliminary sizing is required, and the separating operation is performed by one separating table, even with materials varying relatively very greatly in size while varying very little in their specific gravities.

A material of this character is "run of the mine" coal which consists of coal, rock, slate, bony, sulphur and other impurities, the sizes of all of these ranging from the finest dust to lumps of three or four inches in various dimension. Very large lumps are usually broken by a crusher to avoid injury to the mechanism.

Hereinafter the terms "lighter" and "heavier" will be used for convenience in referring to materials of lesser specific gravity and those of greater specific gravity. Also, the term "divided" as used herein may refer to broken, granular, pulvurulent, particulate or other similar materials.

By my present invention the intermixed materials without previous sizing are fed to the rear end of an air pervious, longitudinally reciprocable table, at a regulable rate so that a bed of the materials of substantial thickness will be maintained upon the air pervious table deck as the bed of materials progresses forwardly and is subjected to stratification and separation of the intermixed materials in accordance with their specific gravities.

One of the principal features of my invention consists in acting upon the bed of materials by means of upwardly-directed air currents of various degrees of intensity in various zones or areas of the table, such zones being preferably harmoniously gradated, that is, decreasing or increasing by fairly close degrees of perviosity consecutively along the table, and further, in selectively regulating the air current intensities in various sub-zones or sub-areas within the respective areas or zones of different air perviosity; this selective regulation in the various sub-zones being susceptible of exceedingly nice gradation through a very wide range.

The invention as embodied is shown applied to a table having the general construction and manner of operation of that shown in my copending application Serial No. 200,080 filed June 20, 1927; although it will be understood that in its broader aspects my invention is equally applicable to other constructions and arrangements of air-operated cleaning tables.

Referring now to the embodiment of my invention illustrated by way of example in the accompanying drawings, an air pervious table 30 is shown consisting preferably of two halves or parts, which may be of similar construction but in reverse position. The deck 30 is provided with an upwardly-projecting, bed-retaining wall 31 across the rear end thereof, and with upwardly-projecting, bed-retaining walls 32 and 33 extending along either exterior side of the table from the rear wall 31 preferably to the front ends of the table. The discharge edge for the lighter superior stratified material is preferably in the form of a transversely-inclined spillage edge 34, extending from the forward outer edge of one side of each table, or each half of the table backwardly and inwardly for a relatively large proportion of the length of the table. If desired, also, there may be a central, upwardly-projecting, longitudinally-extending partition 35, from the rear wall 31 to the innermost point of the spillage or delivery edges 34 for the lighter superior stratified material.

The two halves of the table may both be inclined transversely upwardly and outwardly, and this degree of inclination may be varied. It will be understood that either half of the table could be used as a single table if desired, in so far as concerns many features of the invention.

Figure 2:
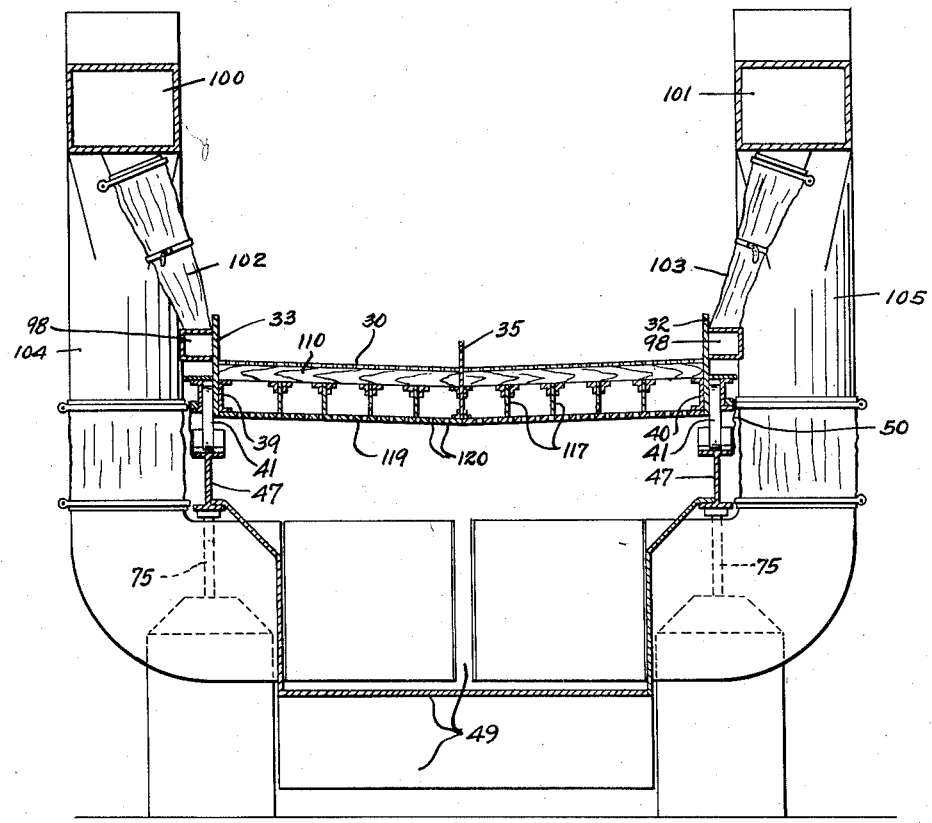
Fig. 2 is an enlarged transverse section on line 2—2 of Fig. 1.

The pervious table deck 30 is supported upon a suitable frame structure, consisting of longitudinally and transversely disposed channel beams 39 and 40, and this structure, with certain other portions later to be described, are longitudinally reciprocated through a short path to impel the bed of materials lengthwise of the table. With this in view, the frame structure 39, 40 is pivotally mounted upon the upper ends of a plurality of arms 41, the lower ends of these arms in turn being pivotally mounted upon the side members 47 of the stationary structure of the air chamber. The arms are preferably inclined upwardly and backwardly when the table is at the rear end of its stroke, so that the path of reciprocation of the table is upwardly and forwardly and downwardly and backwardly. The fixed portion of the stationary air chamber 49 is attached to the frame 47, and is clearly shown in Figs. 1 and 2, and need not be described in detail. It is preferably decreased cross-sectionally gradually forwardly of the table to more effectively control the air pressure lengthwise of the table. A suitable air impervious flexible connection 50 connects the reciprocable table with the stationary air chamber. The embodied means for supplying the air current comprises a rotary fan 71, which is equipped with some suitable form of air current regulating means such as a slide 72, applied to the intake opening of the fan. The fan connects by a conduit 73 with the air chamber 49. Thereby the intensity of the air current action on the entire table can be primarily controlled.

The table is preferably variably upwardly and forwardly inclinable, and in the embodied form thereof the table is provided at either side near the rear thereof with pivot bearings 74, and a plurality of screw-posts 75 are arranged as supports along and beneath the stationary side frames 47 of the air chamber.

The embodied means for reciprocating the table comprises a link 83, connected at its forward end to the rear reach of the frame 39, 40, and connected at its rear end to an eccentric 84, fixed on a shaft 85, which shaft is journaled in bearings 86, mounted upon a suitable support. The shaft 85 is driven in any suitable manner, as by a belt and pulley 87. Cooperating therewith is a suitable spring buffer mechanism, which preferably is always under tension and designed so that the degree of tension does not vary greatly during the short path of reciprocation of the table. As embodied a plurality of rods 89 extend forwardly from the front end of the table, and are reciprocable in apertures in a fixed support 90. On the opposite side of the support 90 helical springs 91 encircle the rods, and are provided with tension adjusting nuts 92.

In the embodied form of table, separating partitions are provided which act both during the separating process, and later to impel the settled heavier material by friction and inertia to the desired place of delivery. As embodied, these separating partitions are inclined forwardly and outwardly, for the purpose of impelling the heavier material which has settled upon the deck by the shortest and quickest route to the side edge of the bed to be immediately discharged therefrom, at a median point in the length of the bed. By directing the heavier material immediately to the edge of the bed, fractional and quick discharge of all the heavier material is rendered possible.

The superior layer of stratified lighter material is given an unimpeded flow directly forwardly along the table, and is discharged freely across the whole length of the forward end of the table, and is provided with an ample spillage edge, which is much greater in length than the width of the table. Furthermore, the heavier material which has settled upon the deck, is impelled by friction and inertia quickly and shortly to the side of the table, and is discharged practically immediately. This avoids the inconvenience and disadvantage of accumulation and concentration of a large, wide and thick bed of this heavy impure material, with the consequent unnecessary work of reciprocating it for a relatively long period of time, and with the disadvantage of remixing it to some degree with the other material or materials.

The discharge devices 98 for the heavier material may be the same or similar to those shown in my copending application Ser. No. 200,080, and need not be described in detail, as the specific structure thereof constitutes no part of the present invention. The headers for supplying air currents to the discharge devices are indicated by 100 and 101 and the flexible connections therefrom by 102 and 103, the headers receiving the air currents by means of connections 104 and 105 from the air chamber.

One of the principal features of my invention is the selective sub-zoning and sub-areal control of the air current intensity. In the present preferred form of my invention, the air zones or areas are gradated increasingly forwardly and inwardly of the table. The zone A in Fig. 3 may be regarded as the area of least air perviosity and of least air current intensity, the zone or area B being of somewhat greater perviosity and air current intensity, the zone or area C of still greater perviosity and air current intensity and the zone D of greatest perviosity or air current intensity. It will be understood that so far as concerns the main principles of my invention the direction of variation in the air current intensity, and the relative areas and shapes of the zones may be very widely varied. However, with the present type of table the illustrated arrangement and disposition of the various zones of air current intensity is preferred.

Means are provided by my invention for selectively controlling the relative intensity of the air current action, with a very great degree of exactness and through a wide range of variation in the air current intensity, in a plurality of sub-zones or sub-areas of each of the various zones or areas of a given air intensity. In the embodied form of said means (Figs. 4 and 5) girder plates 111 are supported at their ends by the vibratible or reciprocable frame 39, 40, and extend preferably transversely forwardly and outwardly at the same angle with the separating partitions. These plates also conveniently support the deck supporting beams 110 by means of brackets 109. These girder plates constitute some of the side walls of a plurality of relatively small or localized air chambers beneath each of the various zones of differing air current intensity. Other chamber-defining plates or walls 117 cooperate with the plates 111, and these are preferably disposed longitudinally of the table, although this may be varied as desired. Plates 117 also serve conveniently to support the deck supporting beams 110. There are formed by the deck 30 and the plates 111 and 117 a plurality of chambers 118 beneath each zono area of the air-pervious deck. Referring to the means for selectively regulating the air current intensity in each of the chambers 118, each chamber is provided with a floor 119, each of these floors being provided with a plurality of apertures 120, and these apertures having a removable plug or stopper 121. The plurality of openable and closable apertures from the main air chamber into each of the sub-areal chambers beneath the various zono areas of the table provide an almost infinite capacity for regulating the air intensity in each of these sub areas in connection with the general zonal arrangement of the air currents. This feature of the invention, however, could be used independently of the general gradated zoning of the table if desired.

Thus in chambers 118—a, 118—b, 118—c and 118—d, for example, the air current intensity could be varied from that of the particular zone A generally, and also as regards the various chambers and sub-zones under consideration. And this variation could be from almost no air current in any given chamber to the maximum in that zone with the particular pressure from the fan and the particular thickness of bed being then carried. The total force of the fan can also be regulated by the slide 72. Thus, if there is local blowing through of the air current in any small area of the table, or a "boiling" and consequent remixing of the materials by excessive air current intensity in any such area, it can be immediately corrected without disturbing the general zonal and air pressure adjustment and regulation of the entire table. The same is true for any such area where there might be a dead spot, and consequent insufficient stratifying action due to insufficient air current intensity.

While the absolute degree of air perviosity of the various table zones may be widely varied, and the relative degree of perviosity of the various zones in any one table may likewise be widely varied or changed, I have found that for most efficient cleaning of certain kinds of coal that a proper degree of perviosity and relative perviosity may be had by making zone A with 23 per cent of air openings, zone B with 29.5 per cent of air openings, zone C with 33.5 per cent of air openings, and zone D with 34 per cent of air openings. It will be understood, however, that the foregoing is exemplary and not restrictive of the invention.

The invention in its broader aspects is not limited to the details of structure or of the process herein disclosed, but that changes may be made therein without departing from the principles of the invention and without sacrificing its chief advantages.

What I claim is:

1. A mechanism for separating intermixed divided materials including in combination a reciprocable, air-pervious deck having a series of gradated zones of different air-perviosities, a plurality of relatively small chambers of fixed dimensions beneath the deck for dividing each zone thereof into a plurality of sub-zones, a main air-supply chamber beneath the deck and sub-chambers and communicating with the deck through said chambers and means for flexibly and independently varying the volume of air passing from the main chamber to each of said sub-chambers whereby the air supply at every point of the deck will be the resultant of the general zoning and the flexible local control.

2. A mechanism for separating intermixed divided materials including in combination a reciprocable, air-pervious deck having a series of gradated zones of different air-perviosities, a sub-deck below the zoned deck having relatively large apertures therein, a plurality of intersecting partitions between the upper deck and the sub-deck for dividing the intervening spacing into a number of relatively small and non-communicating sub-chambers, a common air-supply chamber below the sub-deck, and means for independently varying the admission of air from the common chamber to each sub-chamber, comprising a plurality of removable stoppers for closing the apertures in the sub-deck.

3. A mechanism for separating intermixed divided materials including in combination a reciprocable, air-pervious deck having a series of gradated zones of different air-perviosities, each zone of the deck having a plurality of separating partitions mounted thereon, a plurality of relatively small chambers of fixed dimensions beneath the deck for dividing each zone thereof into a plurality of sub-zones, a main air-supply chamber beneath the deck and sub-chambers and communication with the deck through said chambers, and means for flexibly and independently varying the volume of air passing from the main chamber to each of said sub-chambers whereby the air supply at every point of the deck will be the resultant of the general zoning and the flexible local control.

KENNETH DAVIS.